April 26, 1955 H. R. MATHWICH 2,707,210

PULSE AMPLITUDE MULTIPLEX CROSS TALK REDUCTION SYSTEMS

Filed March 30, 1951

INVENTOR
Howard R. Mathwich
BY
Charles H. Brown
ATTORNEY 2,707,210

PULSE AMPLITUDE MULTIPLEX CROSS TALK REDUCTION SYSTEMS

Howard R. Mathwich, Haddonfield, N. J., assignor to Radio Corporation of America, a corporation of Delaware Application March 30, 1951, Serial No. 218,358

The terminal 15 years of the term of the patent to be granted has been disclaimed 7 Claims. (Cl. 179—15)

This invention relates to pulse amplitude multiplex systems and more particularly to an improvement in receivers for said systems.

It has been noted, that when low frequencies, on the order of 300 cycles or less, are sought to be reproduced from a pulse amplitude multiplex type of signal additional noises occur in the reproduced signal which have come to be known as low frequency cross talk. This type of cross talk occurs when a pulse train of a pulse amplitude multiplex system (known as a PAM system) is passed through a network with a high pass characteristic. This can be thought of as resulting from a movement of the base line of the pulse train due to a time constant for the network which is too small. Attempts to substantially eliminate the cause of the low frequency cross talk by using low frequency peaking circuits, or by increasing the time constants of the high pass networks, all finally result in effects which are somewhat worse than the cure. These effects are caused by increased bounces or pulse overshoot, and noises coming from the power supply. The use of peaking coils and network components having larger values also adds to the expense and size of the equipment.

It is an object of the present invention to provide a novel and improved method and system for substantially eliminating low frequency cross talk in a pulse amplitude multiplex system.

It is a further object of the present invention to provide a method and system for substantially eliminating low frequency cross talk in a pulse amplitude multiplex system without the introduction of other unwanted effects into the system.

It is still a further object of the present invention to provide an inexpensive method and system for substantially eliminating low frequency cross talk in a pulse amplitude multiplex system.

These and other objects of the present invention are attained by clamping the pulse train signal of a pulse amplitude multiplex system to a predetermined voltage level once each frame or cycle of sampling using the sync pulse of the frame to generate the bias level which is applied in an interval between pulses in a frame or at a time when no modulation occurs on the pulse train waveform.

The novel features of the invention, as well as the invention itself, both as to its organization and method of operation, will best be understood from the following description, when read in connection with the accompanying drawing, wherein.

Figure 1:
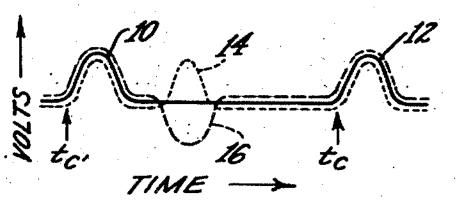
Figure 1 is a drawing of a pulse train shown to illustrate the problem of low frequency cross talk.

Referring now to Figure 1, the solid line represents two sinc pulses 10, 12 with the interval between pulses, $t_c$—$t_c^1$, representing the frame period. When a modulated pulse 14, extending above the base line is inserted between sync pulses, 10, 12, and the pulse train is passed through a high pass characteristic network, the pulse train base is shifted downward. The pulse train then resembles the dotted line and is shown superposed against the original solid line for comparison. In positive or negative pulse amplitude multiplex systems (±PAM) as opposed to one-sided PAM systems, the amplitude modulated pulses may extend below, as well as above, the base line, depending on the wave being sampled. Therefore, when the modulated pulse 16 extends below the base line, the pulse train base is shifted upward as the pulse train is passed through a high pass characteristic network. The pulse train then resembles the dashed line and is shown superposed against the original solid line for comparison. These effects occur if the high pass characteristic network has a time constant which is not sufficiently longer than $1/fm$, where $fm$ is the frequency at which the pulse is being modulated.

In the method and system of the present invention the base level of a pulse train is clamped to a fixed, predetermined value once during each frame at an interval within a frame when there are no modulated pulses superimposed on the base level. By doing this, the time constant required in all networks preceding the clamping is reduced approximately by the factor $$F=\frac{fm}{fp}$$

where $fp$ is the inverse of the frame period$=\frac{1}{t_c-t_c^1}$.

As a specific illustration of the results achieved by the clamping procedure indicated, in a presently operating system it has been determined that for an adequate minimization of low frequency cross talk, the maximum low frequency cut-off of networks carrying the pulse train must be approximately 1.5 cycles per second. This is a difficult and expensive requirement to maintain. In this same system, $fm$=300 cycles per second, which is the minimum frequency sought to be reproduced by the system and $fp$=6.6 kc./s. In accordance with the previously indicated formula the factor of time constant reduction in all the networks preceding the damping network is $$F=\frac{300}{6600}=\frac{1}{22}$$

Therefore the new low frequency response requirement in all the preceding networks is $$22\times 1.5 \text{ C. P. S.}=33 \text{ C. P. S.}$$

a value far easier and less expensive to maintain. The circuit, which is an embodiment of the present invention, is positioned in a PAM receiver just before the channel demodulator. Thereby all the receiver networks ahead of the channel demodulator are affected by the factor of time constant reduction.

Figure 2:
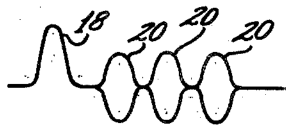
Figure 2 is a drawing of a pulse train shown to illustrate the position of a bias level generating pulse.
Figure 3:
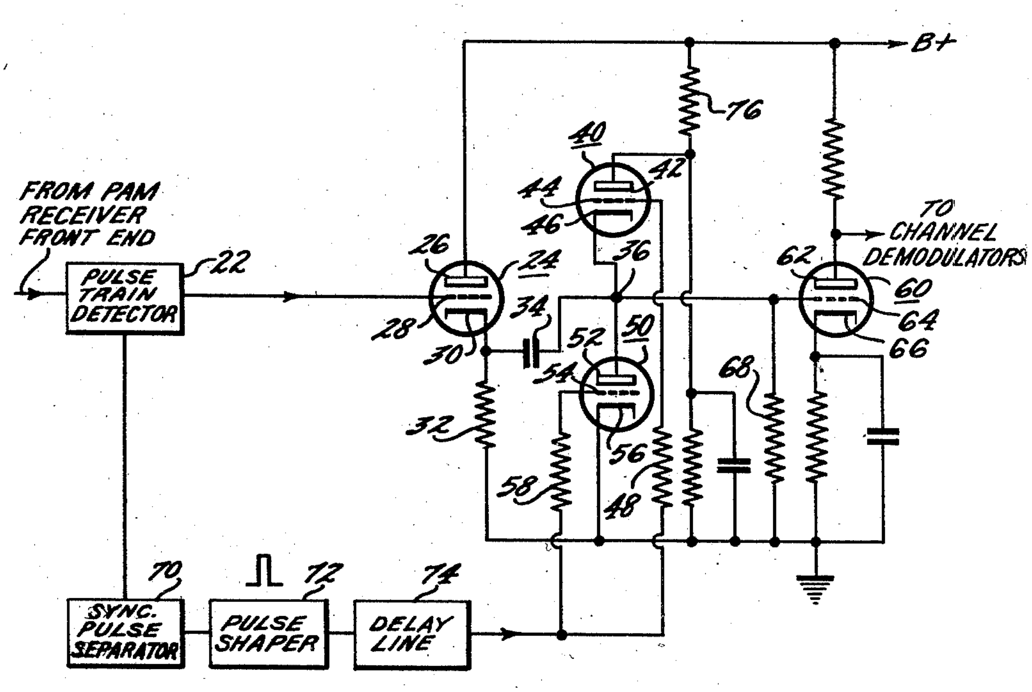
Figure 3 is a circuit diagram of an embodiment of the invention.

Figure 2 represents a frame of ±PAM signals wherein the first pulse 18 is the sync pulse and the remaining pulses 20 are the amplitude modulated pulses from the different channels. The modulated pulses shown represent positive and negative limits of the pulse excursion and are not to be taken as being present simultaneously positively and negatively but only one or the other. Referring now to Figure 3, this pulse amplitude pulse train is detected in the pulse train detector 22 of the PAM receiver. The pulse train is applied to the grid 28 of a cathode follower tube 24 having a cathode load resistor 32 between its cathode 30 and ground or a point of reference potential. It is to be understood that the detected pulse train base level varies due to low frequency cross talk. The cathode 30 of the cathode follower 24 is connected through a condenser 34 to the junction 36 of two series connected tubes 40, 50 and then to the grid 64 of an amplifier tube 60. The amplifier tube 60 has a grid resistor 68 connected between the grid 64 and ground. Output from the amplifier tube 60 is taken from its anode 62 and applied to the channel demodulator which removes the information conveyed by each modulated pulse 20.

The pair of series-connected tubes 40, 50 have the grids 44, 54 connected through resistors 48, 58 to the output of a delay line 74. Plate voltage for the tube 40 of the pair of tubes is obtained through a voltage divider 76 across the B+ supply. The plate voltage is low enough so that in the absence of a positive pulse being applied to its grid, the tube is non-conductive.

Since the tube 50 of the pair of tubes is in series with the tube 40 it cannot conduct until the latter tube is made conductive and a positive pulse is applied to the grid of the tube 50.

A portion of the output of the pulse train detector 22 is applied to a sync pulse separator 70. This serves to separate the sync pulse 18 from the remainder of the frame pulses. Any system known in the art for performing this separation may be used. If the PAM system is of the type wherein the sync pulse 18 is given a greater amplitude than the modulated pulses 20 then a peak detector may be used for such separation. If the sync pulse is of the type that is broader than the modulated pulses then an integrating network followed by a peak detector may be used. The output of the sync pulse separator 70 is applied to a pulse shaper 72 which is merely a stage which narrows and squares the sync pulse separator output. The pulse shaper output is then applied to a delay line 74 which serves to delay the pulse until it is between the sync pulse 18 and the first modulated pulse 20 in the pulse train shown in Figure 2. This generated pulse may be positioned at any other portion of the signal train, where no pulse is superimposed on the base level. The amplitude of the delay line output pulse is made high enough so that the grids of the pair of series connected tubes are driven as far positive as the grid diode action permits. Thus the plate current drawn by tubes 40 and 50 is independent of the height of the delay line output pulse. The delay line output pulse is made narrow enough so that it occurs well between the sync pulse and first modulated pulse.

When both series connected tubes 40, 50 are rendered conductive by the positive pulse at their grids, the voltage at their junction 36 is substantially the plate voltage of the upper one of the two tubes divided by two, since both tubes are usually selected to be of the same type and therefore have substantially the same plate resistances. This one half plate voltage is established as the bias level for the pulse train base line and it is determined once each frame. The plate resistance of the pair of tubes is selected low enough so that the condenser 34 may be charged through the upper of the pair of tubes or the charge on the condenser 34 may be reduced through the lower of the pair of tubes within the duration of the output pulse from the delay line. The application of charge to the condenser 34, or the removal of charge therefrom, is determined by whether or not the level of the cross talk affected pulse train base line is lower or higher than the predetermined bias level at the junction 36 of the series connected tubes 40, 50. Therefore, once each frame, when a bias level generating pulse is applied to the grids 44, 54 of the series connected tubes, charge is added to or subtracted from the condenser 34 so that, when the series connected tubes become cut off, the D.-C. bias level thus established persists throughout the remainder of the frame.

The value of the bias is determined by the plate voltage applied to the upper one of the series-connected tubes as well as the plate resistance of the tubes, as has been previously indicated. The output impedance of the first tube 24 as a cathode follower can be made very low, thus not interfering with the charging of the condenser 34. The time constant of the condenser 34 and the following grid resistor 68 is made long with respect to the reciprocal of the $$\text{frame period} = \frac{1}{fp}$$

in order that the charge on the condenser is substantially maintained until the next clamping action occurs. The bias level generating pulse may also be made to occur at any time position within the duration of a frame which is unmodulated. This may be done since what is actually desired is the maintenance of a constant reference level within intervals whose absolute value is relatively unimportant. The embodiment shown herein, wherein the reference level generating pulse is inserted between the sync pulse and the first modulated pulse is shown by way of example and not to be taken as the sole position wherein said pulse may be applied.

From the foregoing description, it will be readily apparent that there is provided an improved and novel system for substantially eliminating low frequency cross talk in a pulse amplitude multiplex system.

What I claim is:

1. A circuit arrangement for reducing low frequency crosstalk between pulse multiplex signals comprising a train of time spaced periodically recurring synchronizing pulses defining the sampling frames and amplitude modulated signal pulses interposed between said synchronizing pulses superimposed on a given base level and wherein there is at least one periodically recurring interval of base level amplitude transmission during each sampling frame, comprising means to separate said signal pulses from said synchronizing pulses, means to delay said separated synchronizing pulses in time to coincide with said base level transmission interval, means to establish a clamping voltage level concomitantly with said delayed synchronizing pulses, means to clamp said signal pulses to said clamping voltage level, and means to prolong the clamping voltage level at a substantially constant value for the remainder of the sampling frame under consideration.

2. A circuit arrangement for reducing low frequency crosstalk between pulse multiplex signals comprising a train of time spaced periodically recurring synchronizing pulses defining the sampling frames and amplitude modulated signal pulses interposed between said synchronizing pulses superimposed on a given base level and wherein there is at least one periodcially recurring interval of base level transmission during each sampling frame, comprising means to derive control pulses representative of said synchronizing pulses, means to delay said control pulses in time to coincide with said base level transmission interval, means to establish a clamping voltage level concomitantly with said delayed control pulses, means to clamp said signal pulses to said voltage level, and means to maintain said clamped level substantially constant for the remainder of the sampling frame under consideration.

3. In apparatus for translating pulse multiplex signals comprising a train of time spaced periodically recurring synchronizing pulses defining the sample frame and signal pulses interposed between said synchronizing pulses superimposed on a given base level and wherein there is at least one periodically recurring interval of base level amplitude transmission during each sampling frame, a circuit arrangement for reducing low frequency crosstalk between said signal pulses comprising circuit means to establish a point of fixed potential substantially equal to that to which a predetermined portion of the circuit of said translating apparatus is returned during a long period of base level amplitude transmission, means to derive pulses representative of said synchronizing pulses, means to delay said derived pulses to coincide with said base level amplitude transmission interval, means under control of said delayed pulses to connect said point of fixed potential to said predetermined portion of the circuit of said translating apparatus, and means in said predetermined portion of the circuit of said translating apparatus to maintain said fixed potential level therein during the remainder of the sampling frame under consideration.

4. In apparatus for translating pulse multiplex signals comprising a train of time spaced periodically recurring synchronizing pulses defining the sampling frame and signal pulses interposed between said synchronizing pulses superimposed on a given base level and wherein there is at least one periodically recurring interval of base level amplitude transmission during each sampling frame, said apparatus having a coupling circuit which is susceptible of return to a given potential during a period of base level amplitude transmission long relative to the duration of said base level amplitude transmission interval, a circuit arrangement for reducing low frequency crosstalk between said signal pulses, comprising circuit means to establish a point of fixed positive potential substantially equal to said given potential, means to derive pulses representative of said synchronizing pulses, means to delay said derived pulses to coincide with said base level amplitude transmission interval, means under control of said delayed pulses to connect said point of fixed positive potential to said coupling circuit of said translating apparatus, and means in said coupling circuit of said translating apparatus to maintain said fixed potential level therein during the remainder of the sampling frame under consideration.

5. In apparatus for translating pulse multiplex signals comprising a train of time spaced periodically recurring synchronizing pulses defining the sampling frame and signal pulses interposed between said synchronizing pulses superimposed on a given base level and wherein there is at least one periodically recurring interval of base level transmission during each sampling frame, a system for reducing low frequency crosstalk in said signals comprising a pulse translating circuit, a pair of electron discharge tubes connected in series and normally maintained nonconductive, a capacitor connected to the point of interconnection between said series connected electron discharge tubes and one terminal of said pulse translating circuit to applying said pulse train signals to said translatig circuit, a resistor connected between said point of interconnection and the other terminal of said pulse translating circuit, the values of said resistor and said capacitor being selected to provide a time constant which is long when compared to the reciprocal of the period of a sampling frame, means responsive to the synchronizing pulse of a frame to generate a pulse in said sampling frame in an interval of base level transmission for that frame, and means to apply said generated pulse simultaneously to said series connected electron discharge tubes to render the same conductive, whereby a desired D.-C. voltage level for the signals applied to said pulse translating circuit is established.

6. In apparatus for translating pulse multiplex signals comprising a train of time spaced periodically recurring synchronizing pulses defining the sampling frame and signal pulses interposed between said synchronizing pulses superimposed on a given base level and wherein there is at least one periodically recurring interval of base level transmission during each sampling frame, a system for reducing low frequency crosstalk in said signals comprising a first electron discharge tube having cathode, grid and anode electrodes, means to apply said pulse train signals to the grid electrode of said first electron discharge tube, a cathode load resistor having one end connected to the cathode electrode of said first electron discharge tube, a pair of further electron discharge tubes connected in series, said series connected electron discharge tubes being maintained non-conductive, a capacitor connected between the cathode electrode of said first tube and the point of interconnection between said series connected tubes, a resistor connected between said point of interconnection and the other end of said cathode resistor, the values of said resistor and said capacitor being selected to provide a time constant which is long when compared to the reciprocal of the period of a sampling frame, means responsive to the synchronizing pulse of a sampling frame to generate a pulse in said sampling frame in an interval of base level transmission for that frame, and means to apply said generated pulse simultaneously to said series connected electron discharge tubes to render the same conductive, whereby a desired D.-C. bias level for the signals applied to the grid electrode of said first electron discharge tube is established.

7. In apparatus for translating pulse multiplex signals comprising a train of time spaced periodically recurring synchronizing pulses defining the sampling frame and signal pulses interposed between said synchronizing pulses superimposed on a given base level and wherein there is at least one periodically recurring interval of base level transmission during each sampling frame, a system for reducing low frequency crosstalk in said signals comprising a first electron discharge tube having cathode, grid and anode electrodes, means to apply said pulse train signals to the grid electrode of said first electron discharge tube, a cathode load resistor having one end connected to the cathode electrode of said first electron discharge tube, a pair of further electron discharge tube connected in series, said series connected electron discharge tubes being maintained non-conductive, a capacitor connected between the cathode electrode of said first tube and the point of interconnection between said series connected tubes, a resistor connected between said point of interconnection and the other end of said cathode resistor, the values of said resistor and said capacitor being selected to provide a time constant which is long when compared to the reciprocal of the period of a sampling frame, means responsive to the synchronizing pulse of a sampling frame to generate a pulse in said sampling frame in an interval of base level transmission for that frame, and means to apply said generated pulse simultaneously to said series connected electron discharge tubes to render the same conductive, whereby a desired D.-C. bias level for the signals applied to the grid electrode of said first electron discharge tube is established, said series connected electron discharge tubes having anode-cathode resistance at which charging and discharging of said capacitor to the desired bias level is effected within the duration of said generated pulse.

References Cited in the file of this patent

UNITED STATES PATENTS 2,295,023 Beatty et al. ------------ Sept. 8, 1942